Patented Sept. 21, 1948

2,449,959

UNITED STATES PATENT OFFICE

2,449,959

VINYLIDENE CHLORIDE RESIN PLASTICIZED WITH A DI-ESTER OF ENDO-METHYLENE TETRA-HYDRO PHTHALIC ACID

Hanns Peter Staudinger, Ewell, Donald Faulkner, Cambridge, and George Thomas Wright, Manchester, England, assignors to The Distillers Company Limited, Edinburgh, Scotland, a British company No Drawing. Application January 2, 1945, Serial No. 571,110. In Great Britain December 8, 1943

Section 1, Public Law 690, August 8, 1946
Patent expires December 8, 1963

6 Claims. (Cl. 260—31.8)

This invention relates to improvements in compositions comprising vinylidene chloride polymers or copolymers and compounds which act as stabilisers and plasticisers therefor.

Polymers of vinylidene chloride, and its copolymers with other polymerisable materials, tend to decompose and discolour under the influence of heat and/or light. This is particularly undesirable when manipulating polyvinylidene chloride products by moulding or extrusion, since temperatures of the order of 170° C. to 200° C. are required, at which temperatures a great amount of discolouration takes place. For this reason it is highly desirable to employ stabilisers which will prevent or at least minimise the decomposition and darkening effect.

It is therefore one object of the present invention to provide a vinylidene chloride polymer or copolymer having a lesser tendency to decompose or darken by exposure to heat and/or light as compared with the simple polymers and copolymers of vinylidene chloride. Another object of this invention is to provide a vinylidene chloride polymer or copolymer having improved flow properties.

According to the present invention, a vinylidene chloride polymer or copolymer composition is prepared by incorporating with the said polymer or copolymer an organic ester of endo-methylene-tetrahydrophthalic acid, having the general formula:

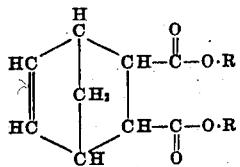

wherein R represents an alkyl, alkenyl, alkynyl, aralkyl or cycloaliphatic group, or any of the said groups containing also a halogen substituent.

The proportion of these esters employed as stabilisers may vary from 1%–30%, preferably, however, between 5% and 20%, of the weight of the polymer. These stabilisers may be added to the vinylidene chloride polymer or copolymer by any known means, for example by dissolving it in a solvent, mixing this solution with the polymer powder and evaporating the inert solvent. Alternatively, the polymer may be milled on hot rollers with the stabilising compound either with or without the aid of a volatile dispersion media.

Particularly suitable esters are those derived from the lower alcohols such as ethyl or butyl alcohols or of the higher aliphatic alcohols such as hexyl and octyl alcohol. The esters may, however, also be prepared from unsaturated alcohols such as allyl, methallyl, chlorallyl and cinnamyl alcohols or even from alcohols containing an acetylenic linkage such as propargyl alcohol.

The following examples illustrate the manner in which the invention may be carried into effect.

*Example 1.*—2 gms. polyvinylidene chloride are mixed with 0.1 gm. of the diallyl ester of endo-methylene-tetra-hydro-phthalic acid; to this mixture is added 0.2 gm. tricresyl phosphate dissolved in 5 ccs. ether. This mass was stirred vigorously and the low boiling ether was then evaporated. The dry powder was pressed in a copper mould to give a disc of 1¾ inches diameter and 3/32 inch thick. The moulding was carried out at 190° C. and pressure and heat were applied for thirty seconds. The moulded disc was of a pale cream colour while a disc moulded under identical conditions but without the addition of the endo-methylene-tetra-hydro-phthalic ester stabiliser was dark brown and showed signs of decomposition. The discs were examined in a "Kodak" colorimeter and the colour determined in reflected light. The disc stabilised in accordance with the invention gave a total colour of 9.5 yellow and red units, while the unstabilised disc made from polyvinylidene chloride and tricresyl phosphate alone gave a total of 20 colour units.

*Example 2.*—25 gms. of a copolymer, prepared by polymerisation of a mixture of vinylidene chloride and diethyl maleate in the proportion of 9 to 1 respectively, were mixed with 4 gms. of dibutyl endomethylene-tetrahydrophthalate. This mixture, which was still in the form of a powder, was then heated up to 180° C. and extruded through a small orifice. The extruded string was of a very light brown colour and extrusion proceeded very smoothly. Higher temperatures had to be used to extrude the unstabilised material. Even before reaching the temperature of 170° C. the unstabilised material started to discolour after about 5 minutes at this temperature. The colour of the unstabilised copolymer after this treatment was dark brown.

*Example 3.*—24 gms. of a co-polymer, prepared from 85 gms. of vinylidene chloride and 15 gms. of ethyl acrylate and having a chlorine content of 60.0% by weight, were mixed with 3 gms. di-hexyl sebacate and 3 gms. di-propargyl-endo-methylene-tetra-hydro-phthalate, dissolved in petrol ether (60°/80° C. boiling range). After removal of the inert diluent, the powdery co-polymer mix was pressed between polished plates at 165° C. and under a pressure of about 1.5 tons per sq. inch, to give a transparent, tough sheet, showing no signs of discoloration.

*Example 4.*—5 gms. of a 90/10 vinylidene chloride/vinyl chloride co-polymer were mixed with a solution of 0.75 gm. of dibutyl endomethylene-tetra-hydro-phthalate and 0.5 gm. of tricresyl phosphate in 30 ccs. ether. After evaporation of the ether, the powder was pressed in a copper mould at 170° C. for 2 minutes, to give a sheet of 1 mm. thickness. This sheet was free from bubbles and had a very light brown colour. When pressing a similar composition, in which the endo-methylene tetra-hydro-phthalic ester was omitted, a sheet of brown colour, containing bubbles, was obtained. The presence of bubbles seemed to indicate the occurrence of some gas evolution owing to decomposition.

What we claim is:

1. A composition of matter comprising a vinylidene chloride resin and from 1% to 30% by weight of the said resin of an organic di-ester of endo-methylene-tetrahydrophthalic acid of the formula

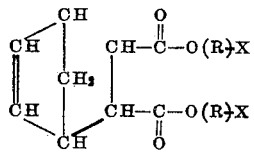

wherein the esterifying radicles R are the same and are selected from the group consisting of alkyl, alkenyl, aralkyl and alkynyl radicles, and wherein X is selected from the group consisting of hydrogen and halogen.

2. A composition according to claim 1 wherein said organic di-ester is present in an amount of from 5% to 20% by weight of the said resin.

3. A composition of matter comprising a vinylidene chloride/diethyl maleate copolymer and from 1 to 30% by weight of the copolymer of dibutyl endo-methylene-tetrahydrophthalate.

4. A composition of matter comprising about 87% by weight of polyvinylidene chloride, about 4% by weight of di-allyl endo-methylene-tetrahydrophthalate and about 90% by weight of tricresyl phosphate.

5. A composition of matter comprising about 80% by weight of a vinylidene chloride/vinyl chloride copolymer, about 12% by weight of dibutyl endo-methylene-tetrahydrophthalate and about 8% by weight of tricresyl phosphate.

6. A hot moulded article formed from a composition comprising a vinylidene chloride resin and from 1–30% by weight of the said resin of an organic di-ester of endo-methylene-tetrahydrophthalic acid of the formula

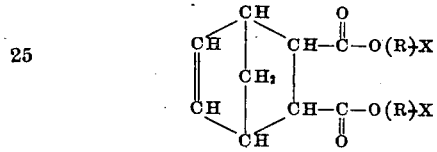

wherein the esterifying radicles R are the same and are selected from the group consisting of alkyl, alkenyl, alkynyl and aralkyl radicles, and wherein X is selected from the group consisting of hydrogen and halogen.

HANNS PETER STAUDINGER.
DONALD FAULKNER.
GEORGE THOMAS WRIGHT.

REFERENCES CITED

The following references are of record in the file of this patent:

UNITED STATES PATENTS

| Number | Name | Date |
|---|---|---|
| 2,311,259 | Staff et al. | Feb. 16, 1943 |